2,983,618

SOYBEAN-OIL DRESSINGS OF THE NON-POURABLE TYPE AND METHOD OF MAKING THE SAME

Daniel Melnick, Teaneck, and Jack Akerboom, Lincroft, N.J., assignors to Corn Products Company, a corporation of Delaware No Drawing. Filed Apr. 27, 1959, Ser. No. 808,904

13 Claims. (Cl. 99—144)

This invention relates to a non-pourable dressing of exceptional flavor stability and also it pertains to a method of enhancing the shelf life of such dressings.

One of the problems confronting the manufacturer of non-pourable dressing is that of flavor stability when the oil in the dressing contains soybean oil as such or as a lightly hydrogenated and winterized soybean salad oil. Blending the latter type of soybean salad oil with a vegetable salad oil having an iodine number of less than 120 imparts improvement to the flavor stability of the dressing made with this oil. Refined soybean oil or hydrogenated and winterized soybean salad oil is an excellent oil for use in the manufacture of non-pourable dressings such as mayonnaise from the standpoint of emulsion stability (very good resistance to freeze break), but soybean salad oil alone has limited value, since it reverts in flavor making its use substantially impossible in quality mayonnaise; the hydrogenated and winterized soybean salad oil is an improved product (flavor-wise), falling in the class of corn oil for mayonnaise production but definitely inferior to cottonseed oil in regard to flavor stability of the resulting mayonnaise. Cottonseed oil mayonnaise is, on the other hand, a poor product in that it is very susceptible to an emulsion break (oil separation) when shipped and/or stored at temperatures less than 40° F. When held at 25° F. for a period of 24 hours cottonseed oil mayonnaise shows oil separation.

It is an object of this invention to provide a novel non-pourable dressing made from soybean salad oil and exhibiting exceptional flavor stability.

Another object of this invention is to provide a method for improving the flavor stability of a non-pourable dressing prepared from soybean salad oil.

Other objects and advantages of this invention will become apparent from the following description and explanation thereof.

It is to be understood that the non-pourable dressings consist of mayonnaise and salad dressing and this characterization is employed in describing the present invention.

Mayonnaise is the emulsified semi-solid food prepared from edible vegetable oil, an acidifying ingredient and an egg yolk-containing material. It usually contains from about 65% to about 85% vegetable oil, vinegar from about 0.15% to 0.70% as acetic acid and liquid egg material (whole egg yolk alone or in combination) from about 4% to about 10%. Flavoring additives include spices; salt and sugar may also be added. Salad dressing contains, in addition to the components listed above for mayonnaise, a cooked or partly cooked starchy paste. Salad dressing contains from about 30% to about 50% vegetable oil, vinegar from about 0.5% to 2.0% as acetic acid, and liquid egg yolk from about 4% to about 7%. Flavoring agents, including spices, salt and sugar, may also be added. Accordingly, the dressing contains about 30% to 85% vegetable oil, about 0.15% to 2% acetic acid and about 4% to 10% egg yolk-containing material.

These non-pourable dressings must be capable of exhibiting a shelf life of about 3 to 5 months at room temperature and when stored in the usual home refrigerator (40°–45° F.) must not show an emulsion break in the form of oil separation. Incorporation of oxygen during the manufacture of the non-pourable dressings should be avoided by protecting the product during manufacture, for example, with nitrogen. If the emulsion is prepared involving dispersion of the oil in an aqueous phase in a mixing bowl under air with the incorporation thereby of about 4% air in the dressing, the flavor life then becomes reduced to about 1½ to 2½ months at room temperature. Storage of the samples at 95° F. constitutes a further accelerated holding test, since under these circumstances the results obtained after one week at 95° F. is equivalent to three weeks at normal room temperature (75° F.).

The present invention is concerned with enhancing the flavor stability of a non-pourable dressing made with not less than about 25% by weight of soybean salad oil in the total salad oil component, the soybean salad oil being refined soybean oil of iodine value of 122 to 142. In the case of a soybean salad oil having an iodine number of 100 to 120, following hydrogenation and winterization as described in U.S. Patents 2,627,467–8, the quantity employed may be at least about 75% by weight of the total salad oil component. The invention calls for the addition of an ethylenediaminetetraacetic acid component to the non-pourable dressing. For the purpose of this invention, the ethylenediaminetetraacetic acid component is employed to designate generically the free acid and the edible mono-, di-, tri-, or tetra-salts thereof. The ethylenediaminetetraacetic acid component is referred to hereinafter as the EDTA component and concentration is expressed in terms of the free EDTA. In the EDTA salts, the edible metallic cations are sodium, potassium or calcium alone or in combinations thereof. Specific examples of the EDTA salts are the disodium salt, the tripotassium salt, the disodium monocalcium salt, the tetrasodium salt, etc. as such or as their hydrates. In the preparation of the non-pourable dressing, it is preferred to add the EDTA component to the aqueous phase prior to the dispersion of the salad oil in this aqueous phase. If desired, the EDTA component may be added in the form of one of its more highly water-soluble salts (viz., the tetra-sodium salt) to the non-pourable dressing after it has been prepared but has as yet not been allowed to set up. When the EDTA component is added at this stage, it is preferably added as an aqueous concentrate.

The ethylenediaminetetraacetic acid component, described above, belongs to the generic group of alkylenediaminetetracarboxylic acid components which also include homologues such as ethylenediaminetetrapropionic acid or the edible salts thereof, propylenediaminetetraacetic acid or the edible salts thereof, propylenediaminetetrapropionic acid or the edible salts thereof, ethylenediaminediacetodipropionic acid or the edible salts thereof, etc. These homologues of EDTA and the EDTA components are used by us on a molecular equivalent basis, expressed as free EDTA. While the homologues of EDTA are useful for the purposes set forth in this specification, we find that the EDTA component is more effective for the purposes of this invention.

In accordance with the present invention the EDTA component comprises about 0.0004 to 2% of the non-pourable dressing and more usually 0.004 to 0.1% of the dressing product.

Whereas the flavor life of a non-pourable dressing is reduced to about ½ if the dressing is made without precautions to exclude air incorporation, the off flavors which develop in the aged dressings are not characterized as rancid. It is impossible to rely upon chemical methods for measuring oxidative deterioration in non-pourable dressings in order to obtain a quantitative index of the flavor improvement therein, particularly those made with soybean salad oil, following supplementation of the dressing with the EDTA component. Peroxide development in such mayonnaise stored at 95° F. for a period of up to four weeks is small, viz., from 1 to only 5 me. per kg. of the separated oil, and there is no significant increase in the concentration of carbonyl compounds in the separated salad oil. Hence, it is necessary to rely upon the results obtained in flavor scoring the mayonnaise with a test panel of expert scorers using objective flavor scoring techniques involving the scoring of the mayonnaise under code markings and statistical analysis of the results obtained. At each scoring session, a full jar is taken from storage, the cap removed, and the top ½ inch of mayonnaise discarded. The remaining mayonnaise is then scored for flavor.

The gist of the present invention resides in the discovery that the EDTA component is specific in stabilizing non-pourable dressings when these are made with soybean salad oil as the sole salad oil or as a substantial fraction of the salad oil phase. There is no virtue in adding EDTA to enhance the flavor stability of mayonnaise made with cottonseed oil or with corn oil as the sole salad oil component. In the case of soybean salad oil, definite improvement is also noted when this oil comprises from 25% to 99% of the total salad oil component, the remainder being a salad oil of iodine value of less than 120. When a modified soybean salad oil is employed, one that has been hydrogenated and winterized and having an iodine number of 100 to 120 as the sole salad oil in the non-pourable dressing, definite improvement in flavor stability is obtained following supplementation of the mayonnaise with the EDTA component. However, when a blend of such a modified soybean salad oil with a vegetable salad oil having an iodine number of less than 120 is supplemented with EDTA, no significant improvement in flavor life of the resulting non-pourable dressing occurs unless at least 75% by weight of the total salad oil component is the modified soybean salad oil. Products with lower concentrations of the modified soybean salad oil of 100 to 120 in iodine value behave in flavor life like a non-pourable dressing made with the sole salad oil having an iodine number of less than 120, viz., cottonseed salad oil. It is not known why the EDTA component is specific for enhancing the flavor life of non-pourable dressings made with soybean salad oil as the sole salad oil or as a substantial fraction of the salad oil phase. Nor is it known why the stabilizing value of the EDTA component is less readily apparent following hydrogenation and winterization of a soybean oil, particularly when this is blended with a vegetable salad oil of iodine value of less than 120 and said blend is then used to make a non-pourable dressing. It is also not known why the EDTA supplement fails to extend the shelf life of a non-pourable dressing made entirely with a vegetable salad oil having an iodine value of less than 120, viz., cottonseed oil, or of a non-pourable dressing made with a vegetable salad oil of iodine value above 120, other than soybean salad oil, viz., corn salad oil. It cannot be reasoned that the flavor stability of a non-pourable dressing made with cottonseed oil is so good that it cannot profit from the EDTA supplement, since such dressings do exhibit flavor deterioration with time. Furthermore, dressings made with corn oil likewise fail to profit to a significant degree from the EDTA supplement and the latter dressings are regularly much inferior in flavor quality and flavor stability to the non-pourable dressings made with cottonseed salad oil as the sole salad oil component. Whereas, corn oil mayonnaise on aging may show a numerical flavor score slightly higher as a result of supplementation with the EDTA component, both products are scored as unacceptable in flavor after aging.

The points made in the foregoing discussion are supported by experimental findings. Six different mayonnaise products were made with the same formula and the same method of manufacture but differing among themselves in the salad oil component used. Each mayonnaise was produced in two lots, one lot serving as the control and the other serving as the experimental sample differing from the control only in that it contained 100 p.p.m. of EDTA added in the form of the disodium salt. The variables in preparing the test mayonnaise samples are listed in Table I which follows. The formula employed in the manufacture of the basic mayonnaise samples is given below:

MAYONNAISE FORMULA

Ingredient: Parts by weight
Salad oil ---------------------------------- 78.0
Vinegar (25 grain) ------------------------- 11.5
Liquid egg material ------------------------ 8.0
Salt --------------------------------------- 1.5
Spices ------------------------------------- 1.0

Table I

VARIABLES IN PREPARING TEST MAYONNAISE SAMPLES [1] POINTING TO INVENTION IN THE PRESENT INVESTIGATION

| Salad Oil Component | Iodine Value (Wijs) | Added EDTA Component,[2] p.p.m. | Identity of Mayonnaise |
|---|---|---|---|
| All soybean salad oil | 131 | 0 | Control. |
|  | 131 | 100 | Example I of the present invention. |
| All soybean salad oil, modified by prior hydrogenation and winterization. | 116 | 0 | Control. |
|  | 116 | 100 | Example II of the present invention. |
| 50:50 blend of soybean salad oil and cottonseed salad oil. | 123 | 0 | Control. |
|  | 123 | 100 | Example III of the present invention. |
| 50:50 blend of the modified soybean salad oil and cotton-seed salad oil. | 116 | 0 | Control. |
|  | 116 | 100 | Reference–A. |
| All cottonseed salad oil | 115 | 0 | Control. |
|  | 115 | 100 | Reference–B. |
| All corn salad oil | 125 | 0 | Control. |
|  | 125 | 100 | Reference–C. |

[1] With the exception of the variables tabulated above, all mayonnaise products were exact replicates in formulation and method of manufacture.
[2] Added as the disodium salt of EDTA, but concentration expressed as free EDTA.

The method of making the mayonnaise samples is as follows:

(1) The salt and spices are blended with the liquid egg material at low speed agitation in a mixing bowl until a uniform mixture is obtained.

(2) With the agitator at high speed, the oil is slowly added to form an oil-in-water emulsion.

(3) The vinegar is added at low speed agitation, and the mixture is blended until uniform.

The resulting mayonnaise samples were scored fresh, under code, by a test panel of expert mayonnaise scorers and the results in the paired comparisons were subjected to statistical analysis for determining whether there was a significant difference in the flavor quality in the given mayonnaise sample as a result of supplementation with the EDTA component. The results of this study are summarized in Table II which follows. The "$p$" value in comparing the flavor scores of one mayonnaise versus its control indicates how much reliance can be placed upon the difference noted. Thus, when "$p$" is found to be equal to 0.05, it means that there are 95 chances out of 100 that the difference noted between the two mayonnaise samples is not due to chance alone; $p=0.01$ means that there are 99 chances out of 100 that the difference noted between the two mayonnaise samples is not due to chance alone, etc.

The data in Table II point to the remarkable effective influence of the EDTA component in the mayonnaise in stabilizing this dressing when refined soybean oil or the modified soybean oil is used as the sole salad oil component of the dressing. In every paired comparison the improvements in flavor of the samples containing the EDTA component is statistically significant. With a 50:50 blend of refined soybean oil with cottonseed oil there is noted a stabilizing influence of EDTA on flavor of the dressing only after it has been subjected to storage at 95° F. or at 75° F. Mayonnaise prepared with the 50:50 blend of the modified soybean oil (soybean oil of 116 iodine number following hydrogenation and winterization) and cottonseed oil fails to show any advantage resulting from the EDTA supplement. Likewise, mayonnaise samples prepared with cottonseed or corn salad oils are not improved in either initial flavor quality or in flavor stability as a result of including in their formulation the EDTA component. In no case is there any effect on the freeze resistance of the mayonnaise following the addition of the EDTA component.

EXAMPLE II

The composition and method of Example I is employed but the salad oil ingredient is composed of all soybean salad oil which has been modified by prior hydrogenation and winterization to provide a salad oil with an iodine value of 116. A control batch of mayonnaise is prepared with the modified soybean salad oil in which the EDTA component is omitted. The flavor score of the experimental mayonnaise is markedly superior to that of the control, without the EDTA component, as is shown in Table II (identity also indicated in Table I). Both samples exhibit freedom from emulsion separation (in the form of free oil) as a result of storage for a period of 168 hours (1 week) at 25° F. after which time the test was discontinued.

EXAMPLE III

The composition and method of Example I is em-

*Table II*

SPECIFICITY OF THE EDTA COMPONENT IN STABILIZING ONLY THE MAYONNAISE PRODUCTS MADE WITH SOYBEAN SALAD OIL

| Storage | Flavor Score [2] | Salad Oil component [1] of the Mayonnaise | | | | | | | | | | |
|---|---|---|---|---|---|---|---|---|---|---|---|---|
| | | All SBO | | All SBO (M) | | 50:50, SBO and CSO | | 50:50, SBO (M) and CSO | | All CSO | | All CO | |
| | | Control | +EDTA | Control | +EDTA | Control | +EDTA | Control | +EDTA | Control | +EDTA | Control | +EDTA |
| None—fresh | Average | 2.85 | 3.70 | 3.45 | 4.45 | 3.60 | 4.05 | 4.10 | 4.25 | 4.25 | 4.40 | 3.05 | 3.10 |
| | Significance | $p=0.05$ | | $p=0.05$ | | none | | none | | none | | none | |
| 2 wks. at 95° F | Average | 2.05 | 3.10 | 2.60 | 3.65 | 2.70 | 3.60 | 3.20 | 3.75 | 3.05 | 3.65 | 2.65 | 2.70 |
| | Significance | $p=0.01$ | | $p=0.02$ | | $p=0.05$ | | none | | none | | none | |
| 4 wks. at 95° F | Average | 1.85 | 3.05 | 2.40 | 3.35 | 2.45 | 3.35 | 3.25 | 3.15 | 3.20 | 3.30 | 1.60 | 2.25 |
| | Significance | $p=0.001$ | | $p=0.05$ | | $p=0.05$ | | none | | none | | none | |
| 6 wks. at 95° F | Average | 1.75 | 3.00 | 2.25 | 3.20 | 2.10 | 3.15 | 3.15 | 3.25 | 3.15 | 3.00 | 1.85 | 2.20 |
| | Significance | $p=0.01$ | | $p=0.01$ | | $p=0.05$ | | none | | none | | none | |
| 6 wks. at 75° F | Average | 2.35 | 3.25 | 2.70 | 3.75 | 2.55 | 3.30 | 3.40 | 3.75 | 3.35 | 3.40 | 2.60 | 2.75 |
| | Significance | $p=0.05$ | | $p=0.01$ | | $p=0.05$ | | none | | none | | none | |

[1] SBO=refined soybean salad oil; SBO (M)=soybean salad oil (modified) of 116 iodine number, following hydrogenation and winterization CSO=cottonseed salad oil; CO=corn salad oil.
[2] Average score obtained from a panel of 10 expert flavor scorers: 5=good; 4=fairly good; 3=fair; 2=poor; 1=very poor.

To provide a better understanding of the present invention, reference will now be had to the following specific examples:

EXAMPLE I

A mayonnaise is prepared using the following formula and process.

Ingredient: Parts by weight
Soybean salad oil of 131 iodine value _____ 78.0
Vinegar (25 grain) _____ 11.5
Liquid egg material _____ 8.0
Salt _____ 1.5
Spices _____ 1.0
EDTA, added as the disodium salt _____ 0.01

The salt and spices are blended with the liquid egg material in a Hobart mixer bowl with slow speed agitation for 3 minutes. With the agitator at high speed, the oil is slowly added over a 6 minute period to form an oil-in-water emulsion. The emulsion is whipped an additional 2 minutes at high speed. The vinegar containing the EDTA ingredient dissolved therein is added to the emulsion with slow speed mixing. The mixture is then blended at low speed for 2 minutes, after which the mayonnaise is filled into glass jars and the latter capped.

The flavor score of the mayonnaise of this example is markedly superior to that of the control, without the EDTA component, as is shown in Table II (identity also indicated in Table I). Both samples exhibit freedom from emulsion separation (in the form of free oil) as a result of storage for a period of 168 hours (1 week) at 25° F. after which time the test was discontinued.

ployed but the salad oil ingredient is composed of a 50:50 blend of soybean salad oil of Example I and cottonseed salad oil with an iodine number of 116. The iodine value of this blend is 123. A control batch of mayonnaise is prepared with the 50:50 soybean salad oil and cottonseed salad oil blend in which the EDTA component is omitted. The flavor score of the experimental mayonnaise is definitely superior to that of the control, without the EDTA component, as is shown in Table II (identity also indicated in Table I). Both samples exhibit freedom from emulsion separation (in the form of free oil) following storage for a period of up to 144 hours (6 days) at 25° F.

EXAMPLE IV

A mayonnaise is prepared using the following formula and process.

Ingredient: Parts by weight
Soybean salad oil of 134 iodine value _____ 75.0
Vinegar (50 grain) _____ 9.0
Liquid egg material _____ 10.5
Salt _____ 2.0
Sugar _____ 1.5
Spices _____ 1.0
EDTA, added as the tetrasodium salt _____ 0.02
Water _____ 1.0

The salt, sugar and spices are dissolved or dispersed in the liquid egg material. The EDTA component is dissolved in the water and added to the egg-spice mixture. A mayonnaise premix is prepared by adding the oil and vinegar ingredients with mixing to the egg-spice mixture in a mixing tank equipped with an agitator. The mayonnaise premix is then passed through a colloid mill under nitrogen to form the finished mayonnaise emulsion. A control mayonnaise is also prepared in which the EDTA component is omitted.

When the mayonnaise samples are stored in capped jars at 75° F. for flavoring by a panel of expert scorers, the mayonnaise of this example containing the EDTA component shows excellent flavor stability and is scored acceptable (above a fair) up to a period of 4 months whereas the control mayonnaise prepared without the EDTA component is scored poor at the end of 1 month of storage. Neither the mayonnaise of this example nor the control sample shows emulsion separation (in the form of free oil) as a result of storage for a period of 6 weeks at 25° F.

EXAMPLE V

The composition and method of Example IV is employed but the salad oil ingredient is a blend consisting of 50 parts of soybean salad oil of Example IV, 35 parts of sesame oil with an iodine value of 113 and 15 parts of peanut oil with an iodine value of 98. The EDTA component added at a level of 0.01 part by weight as the disodium monocalcium salt is dissolved in the vinegar ingredient. A control mayonnaise is prepared, one which does not contain the EDTA component. The mayonnaise is filled into jars, capped and stored at 75° F. for flavor scoring.

At the end of 4 months, the mayonnaise of the example, containing the EDTA component, is scored fair to fairly good, whereas the control mayonnaise is scored poor at the end of 2 months. The mayonnaise of this example and the control sample show no emulsion separation (in the form of free oil) following storage for a period of up to 3 weeks at 25° F.

EXAMPLE VI

The composition and method of Example IV is employed but the salad oil ingredient is a blend consisting of 75% cotton seed salad oil with an iodine value of 113 and 25% soybean salad oil with an iodine value of 134. The blend has an iodine value of 118. The EDTA component is added at a level of 0.0025 part by weight as free EDTA and is dissolved in the vinegar ingredient. A control mayonnaise is also prepared, one which does not contain the EDTA component.

When the mayonnaise of this example is stored at 75° F. for flavoring by a panel of expert scorers, it is scored acceptable at the end of 4 months of storage whereas the control mayonnaise is scored unacceptable at the end of 2½ months of storage. Both the experimental and control mayonnaise samples show no emulsion separation (in the form of free oil) following storage for a period of up to 4 days at 25° F. Another control mayonnaise, made according to this example but with the cottonseed salad oil as the sole salad oil in the dressing, exhibited an emulsion separation after storage of 1 day at 25° F.

EXAMPLE VII

A salad dressing is prepared using the following formula and process.

Ingredient:

| | Parts by weight |
|---|---|
| Mayonnaise component— | |
| Mayonnaise | 46.2 |
| Starch base component— | |
| Vinegar (100 gr. spirit) | 8.7 |
| Water | 28.6 |
| Sugar | 10.0 |
| Salt | 1.2 |
| Starch | 5.0 |
| Spices | 0.3 |
| EDTA, in the form of the disodium salt | 0.02 |

The mayonnaise ingredient is prepared according to the composition and method of Example I except that it does not contain the EDTA component. The starch base is prepared by blending the sugar, salt, starch, spices and EDTA component together, adding the water and vinegar thereto and heating the mixture with agitation until the temperature reaches 195° F. After holding the mixture at this temperature for a period of about 10 minutes, the mixture is cooled with agitation to a temperature of about 80° F. and blended with the mayonnaise component. A control batch of salad dressing is also prepared in which the EDTA component is omitted.

Samples of the salad dressing of this example and the control are stored at 75° F. for flavor scoring by a panel of expert flavor scorers. The salad dressing containing the EDTA component is scored fair to fairly good in flavor at the end of 4 months whereas the control salad dressing without the EDTA ingredient is scored poor after 2 months.

Neither the salad dressing of this example nor the control salad dressing shows emulsion separation (in the form of free oil) as a result of storage at 25° F. for a period of 6 weeks.

EXAMPLE VIII

A salad dressing is prepared using the following formula and method.

Ingredient:

| | Parts by weight |
|---|---|
| Starch base component— | |
| Starch | 2.5 |
| Sugar | 8.5 |
| Water | 19.0 |
| Vinegar (100 grain) | 11.0 |
| Salt | 0.8 |
| Spices | 0.8 |
| EDTA, added as the disodium monocalcium salt | 0.2 |
| Mayonnaise component— | |
| Soybean salad oil of 134 iodine value | 45.0 |
| Egg yolk (10% salt) | 6.0 |
| Salt | 0.7 |
| Water | 3.0 |
| Vinegar (100 grain) | 1.5 |
| Spices | 1.0 |

The starch base ingredient is prepared by blending the starch, sugar, salt, spices and EDTA component together, adding the water and vinegar thereto and heating the mixture with agitation to a temperature of 195° F. and holding the mixture at this temperature for a period of 5 minutes. The water lost by evaporation during cooking is replaced and the starch base ingredient is cooled to 80° F. and blended with agitation to a uniform consistency with the mayonnaise ingredient prepared as follows. An egg-spice mixture is prepared by blending the egg yolk, salt and spices until uniform. The salad oil and vinegar are added with agitation to form a mayonnaise premix. The premix is then passed through a colloid mill to produce the finished mayonnaise. A control batch of salad dressing is also prepared in which the EDTA component is omitted.

Capped jars of the salad dressing of this example and of the control are stored at 75° F. for flavor scoring by a panel of expert flavor scorers. The salad dressing containing the EDTA component is scored acceptable (above a fair in flavor) at the end of 4 months whereas the control salad dressing without the EDTA component is scored unacceptable (poor) after 2 months of storage.

Neither the salad dressing of this example nor the control salad dressing shows emulsion separation (in the form of free oil) as a result of storage at 25° F. for a period of 6 weeks.

Having thus provided a written description along with specific examples of our invention, it should be understood that no undue limitations or restrictions are to be imposed by reason thereof but that the present invention is defined by the appended claims.

We claim:
1. A mayonnaise consisting essentially of a soybean salad oil as substantially the total salad oil phase and containing about 0.0004% to about 2% of an EDTA component, when said soybean salad oil has an iodine value of about 100 to 120 it constitutes about 75% to 100% of the total salad oil phase and when said soybean salad oil has an iodine value of about 122 to 142 it constitutes about 50% to 100% of the total salad oil phase.

2. A mayonnaise consisting essentially of a soybean-cottonseed salad oil blend as substantially the total salad oil phase and containing about 0.0004% to about 2% of an EDTA component, said soybean salad oil in the blend having an iodine value of about 122 to 142 and constituting from about 50% to about 99% of the total salad oil phase and said cottonseed salad oil constituting from about 50% to about 1% of the total salad oil phase.

3. A mayonnaise consisting essentially of a soybean salad oil as substantially the total salad oil phase and containing about 0.0004% to about 2% of an EDTA component, said soybean salad oil having an iodine value of about 122 to 142.

4. A mayonnaise consisting essentially of a soybean salad oil as substantially the total salad oil phase and containing about 0.0004% to about 2% of an EDTA component, said soybean salad oil having an iodine value of about 100 to 120.

5. The product of claim 1 wherein the EDTA component is present in concentration of 0.004 to 0.1%.

6. The product of claim 2 wherein the EDTA component is present in concentration of 0.004 to 0.1%.

7. The product of claim 3 wherein the EDTA component is present in concentration of 0.004 to 0.1%.

8. The product of claim 4 wherein the EDTA component is present in concentration of 0.004 to 0.1%.

9. The process of improving the flavor life of mayonnaise made with soybean salad oil of 122 to 142 in iodine value and in concentration of at least 50% of the total salad oil phase, said process comprising the addition to the mayonnaise of about 0.0004% to 2% of an EDTA component.

10. The process of claim 9 wherein the process comprises the addition of about 0.004% to 0.1% of an EDTA component.

11. The process of claim 9 wherein the soybean salad oil is present in concentration of substantially 100% of the total salad oil phase.

12. The process of improving the flavor life of mayonnaise made with soybean salad oil of 100 to 122 iodine value, said soybean salad oil being present in concentration of substantially 100% of the total salad oil phase, and said process comprising the addition to the mayonnaise of about 0.0004% to 2% of an EDTA component.

13. The process of claim 12 wherein the process comprises the addition of about 0.004% to 0.1% of an EDTA component.

References Cited in the file of this patent

UNITED STATES PATENTS

| | | |
|---|---|---|
| 2,627,469 | Melnick et al. | Feb. 3, 1953 |
| 2,885,292 | Stapf | May 5, 1959 |